US008562263B2

(12) United States Patent
van Valkenburg

(10) Patent No.: US 8,562,263 B2
(45) Date of Patent: Oct. 22, 2013

(54) LATERAL MOVEMENT INHIBITOR FOR A DRILL PRESS TABLE AND AN ADJUSTABLE DRILL PRESS TABLE INCORPORATING THE SAME

(76) Inventor: Sjoerd Anne van Valkenburg, The Hague (NL)

( * ) Notice: Subject to any disclaimer, the term of this patent is extended or adjusted under 35 U.S.C. 154(b) by 300 days.

(21) Appl. No.: 13/206,576

(22) Filed: Aug. 10, 2011

(65) Prior Publication Data

US 2013/0039710 A1 Feb. 14, 2013

(51) Int. Cl.
*B23B 39/00* (2006.01)
(52) U.S. Cl.
USPC ............................ 408/1 R; 408/87; 269/71
(58) Field of Classification Search
CPC ................................. B23Q 3/02; B23Q 3/06
USPC .......... 408/1 R, 87, 89, 91; 108/147, 145, 96; 269/71, 75; 29/281.1
See application file for complete search history.

(56) References Cited

U.S. PATENT DOCUMENTS

| 1,432,027 | A | * | 10/1922 | Leonard et al. | 408/100 |
| 2,638,800 | A | * | 5/1953 | Frushour | 408/234 |
| 3,223,055 | A | * | 12/1965 | Braun | 108/145 |
| 5,758,849 | A | * | 6/1998 | Bui et al. | 248/125.1 |
| 2003/0021644 | A1 | * | 1/2003 | Chen | 408/87 |

* cited by examiner

*Primary Examiner* — Daniel Howell
*Assistant Examiner* — Ryan Rufo
(74) *Attorney, Agent, or Firm* — Sand & Sebolt

(57) ABSTRACT

A lateral motion inhibitor assembly, a drill press incorporating the inhibitor and a method of using the same. The inhibitor assembly includes a clamping assembly which fixedly engages a vertical support column of the drill press, a connector assembly which fixedly engages a horizontally-oriented drill press table; and a plate assembly which extends between and is pivotally secured to both the clamping and connector assemblies. The plate assembly includes a first plate and second plate that are pivotally secured together. The inhibitor assembly restrains the table and drill against lateral movement relative to each other when the table's vertical position on the support column is changed. The inhibitor assembly ensures that both an initial drill hole and a subsequent drill hole are drilled in substantially the same location on a workpiece supported on the table.

28 Claims, 5 Drawing Sheets

LATERAL MOVEMENT INHIBITOR FOR A DRILL PRESS TABLE AND AN ADJUSTABLE DRILL PRESS TABLE INCORPORATING THE SAME

BACKGROUND OF THE INVENTION

1. Technical Field

This invention relates generally to drill presses. More particularly, this invention relates to vertically adjustable drill press tables. Specifically, this invention is directed to an inhibitor assembly for a drill press table that is secured to a drill press support column at one end and to the drill press table at the other end to prevent the table from moving laterally as its vertical position is changed on the column.

2. Background Information

Moving a drill press table up or down requires loosening the handle and securing the table against the column. If it is necessary to move the table in the middle of completing a task, the movement invariably results in losing the precise lateral setting of the workpiece and the previously found "target" for the hole being drilled. This happens, for example, when a user needs to use a longer drill bit and then a shorter drill bit in the same location or a wider diameter bit followed by a narrower diameter bit. For example, a user could utilize a larger diameter bit for drilling a countersink and then need a smaller diameter bit to drill a through bore. In order for this operation to be accomplished in a failsafe manner, the user absolutely does not want to disturb the lateral setting of the workpiece. This is almost impossible because during the movement of the drill press table some lateral movement is inevitable. At best, the user will spend time and effort to retrieve the original setting. This is cumbersome, especially in the case of repetitive "two-diameter" holes. Additionally, the table often moves laterally from simply working on it without any vertical translation.

There is therefore a need in the art for a drill press table that can be vertically adjusted up and down without undergoing any significant lateral motion.

BRIEF SUMMARY OF THE INVENTION

The device of the present invention is a lateral motion inhibitor assembly, a drill press table incorporating the inhibitor assembly same and a method of using the same. The drill press table is able to be vertically adjusted up and down on a vertical support column and the lateral motion inhibitor assembly substantially reduces the amount of lateral motion the drill and/or drill table will undergo during such adjustment. The inhibitor assembly includes a clamping assembly which fixedly engages a vertical support column of the drill press, a connector assembly which fixedly engages a horizontally-oriented drill press table; and a plate assembly which extends between and is pivotally secured to both the clamping and connector assemblies. The plate assembly includes a first plate and second plate that are pivotally secured together. The inhibitor assembly restrains the table and drill against lateral movement relative to each other when the table's vertical position on the column is changed. The inhibitor assembly ensures that both an initial drill hole and a subsequent drill hole are drilled in substantially the same location on a workpiece supported on the table.

The lateral motion inhibitor assembly, which can be left permanently attached to the drill press, includes a clamp type sleeve that engages around the drill press column, a connector assembly that is attached to the underside of the table, and two hinged plates disposed between the sleeve and the connector assembly.

The lateral motion inhibitor assembly can be of a universal type nature in that it can be engaged with any drill press table or it can be specifically configured to fit specific brands of drill press tables. Preferably, the connector assembly of the lateral motion inhibitor is engaged with the drill press table using nuts and bolts but rare earth magnets could also be used. The inhibitor assembly may be manufactured from any suitable type of material that permits it to withstand the lateral torque it is designed to substantially prevent.

BRIEF DESCRIPTION OF THE SEVERAL VIEWS OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Figure 1:
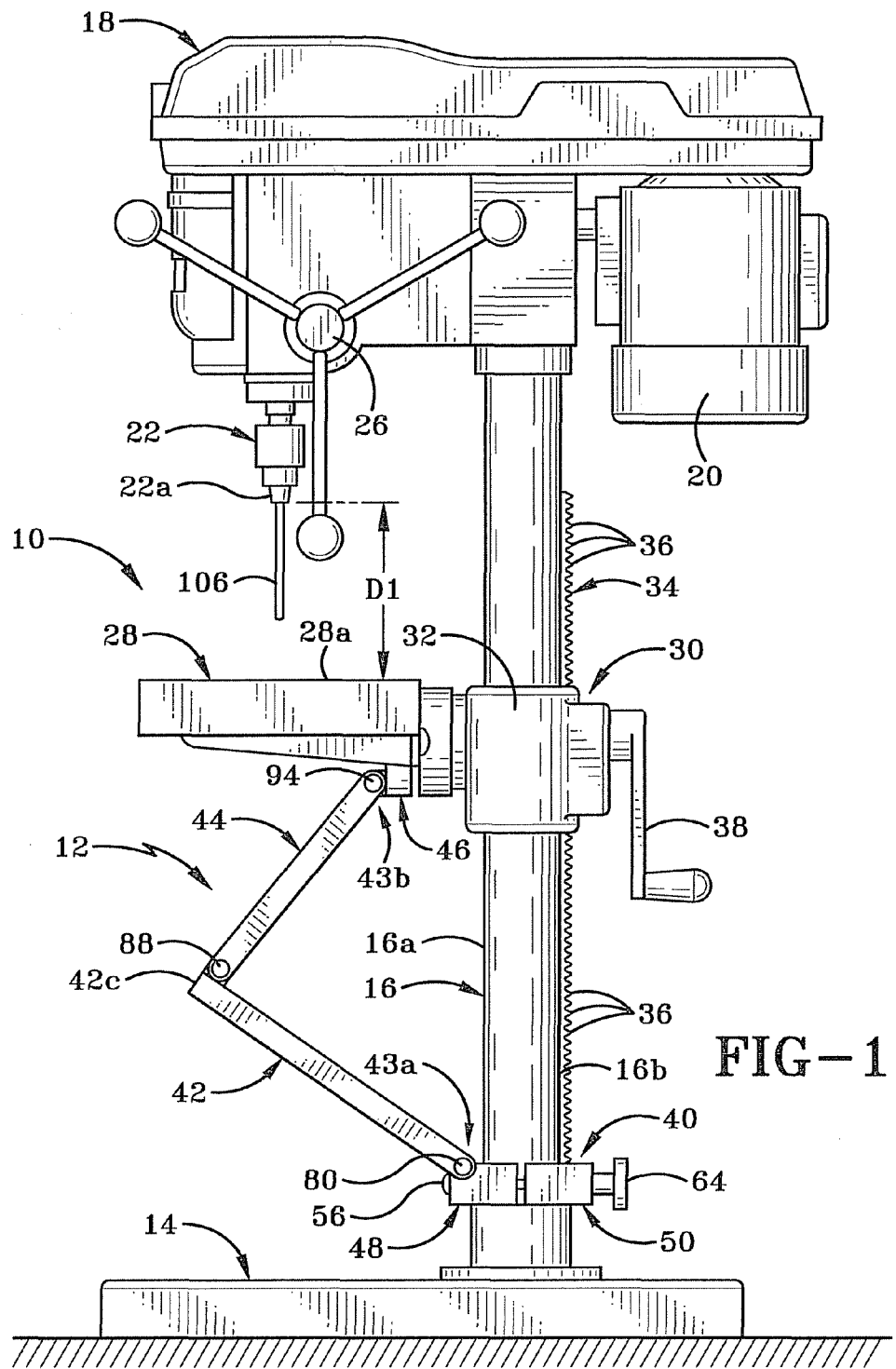
FIG. 1 is a side view of the adjustable drill press table incorporating a lateral motion inhibitor in accordance with the present invention.

Referring to FIGS. 1-5 there is shown a drill press 10 incorporating a lateral motion inhibitor assembly 12 in accordance with the present invention. Drill press 10 includes a base 14, a support column 16 which extends vertically upwardly from base 14, and a housing 18 supported on column 16 some distance above base 14. Housing 18 may include a number of different components such as a motor 20 that is operationally connected to a chuck 22. Chuck 22 is configured to detachably receive a drill bit, such as bit 106, therein. A capstan wheel 26 is provided on housing 18 to enable fine vertical adjustments of chuck 22 to aid in correctly positioning the drill bit for drilling into a workpiece 110 (FIG. 4), as will be hereinafter described. Although not illustrated herein, it will be understood that many other components such as buttons to activate or deactivate the drill, gears, speed controls etc. may be provided in and on housing 18. These additional components are known in the art and do not form any part of the present invention. Consequently, they will not be discussed in any detail herein.

A drill press table 28 extends horizontally outwardly away from column 16 in a location somewhere between base 14 and housing 18. The workpiece 110 to be drilled will be placed on an upper surface 28*a* of table 28 in a location beneath chuck 22 and drill bit 106. An adjustment assembly 30 secures drill press table 28 to column 16. Adjustment assembly 30 is provided to move table 28 vertically upwardly or downwardly so as to position table 28 either closer to chuck 22 or further away therefrom. As illustrated in the attached figures, adjustment assembly 30 includes a housing 32 that circumscribes column 16 and a crank 38 that engages housing 32. Adjustment assembly 30 further includes a track 34 which extends vertically along a portion of the rear surface 16b of column 16. Track 34 is provided with a plurality of teeth 36 that project rearwardly and outwardly from track 34 and are configured to interlocking engage with a gear assembly (not shown) in housing 32. Manual crank 38 is rotated in a first direction to vertically raise table 28 toward chuck 22 and is rotated in a second direction to vertically lower table 28 away from chuck 22. It will be understood that other suitable types of adjustment assemblies to permit vertical adjustment of table 28 may be utilized in drill press 10 without departing from the scope of the present invention.

Sometimes when a user is working on a workpiece 110, it is necessary for him to drill a "combination hole". The term "combination hole" as used herein should be understood to be referring to a hole that is drilled into a workpiece using more than one drill bit, where each subsequent drill bit has to be inserted into the initial hole that was drilled with a first drill bit. Each time the user needs to change the drill bit, adjustment assembly 30 has to be activated to lower table 28 vertically so that it is further away from chuck 22 so as to provide the necessary space to replace the drill bit. Once this has been done, adjustment assembly 30 is activated to vertically raise table 28 again so that it moves closer to chuck 22 and into an appropriate position to drill another hole into the workpiece. It is during these vertical raising and lowering motions that previously known devices have had a tendency to shift one or both of the table and drill chuck laterally relative to each other so that subsequent drill bits tend to drill holes in the workpiece that are displaced a small distance laterally away from the initial drill hole. The lateral shifting can occur in such a manner that the subsequent hole is displaced sideways from the initial hole, and/or towards the front thereof, and/or towards the back thereof. These issues are especially true when working with awkwardly shaped or large work pieces.

This undesirable lateral shifting motion found in previously known devices has been addressed in the present invention by the provision of the lateral motion inhibitor assembly 12. Inhibitor assembly 12 locks the table 28 and drill housing 18 against lateral motion relative to each other during the vertical raising and lowering actions by the adjustment assembly 30. Thus, the drill press 10 incorporating inhibitor assembly 12 is capable of drilling a "combination hole" where subsequently drilled holes fall in substantially the exact same location on the workpiece as the initial hole and there is no displacement sideways and/or to the back and/or front of the initial hole.

Inhibitor assembly 12 comprises a clamping assembly 40 for engaging column 16, a connector assembly 46 for engaging table 28, and a plate assembly 42/44 that extends between clamping assembly 40 and connector assembly 46. Plate assembly 42/44 has a first end 43a secured to clamping assembly 40 and a second end 43b secured to connector assembly 46. Plate assembly 42/44 also has a length "H1" (FIG. 1) as measured vertically between the first and second ends 43a, 43b thereof. This length changes as the table 28 is raised and lowered in order to keep connector assembly 46 operationally engaged with clamping assembly 40. The strength and rigidity of inhibitor assembly 12 substantially prevents table 28 from moving laterally, i.e., from side-to-side or backwards-and-forwards in a horizontal plane when the table's vertical position is adjusted by adjustment assembly 30.

Figure 3:
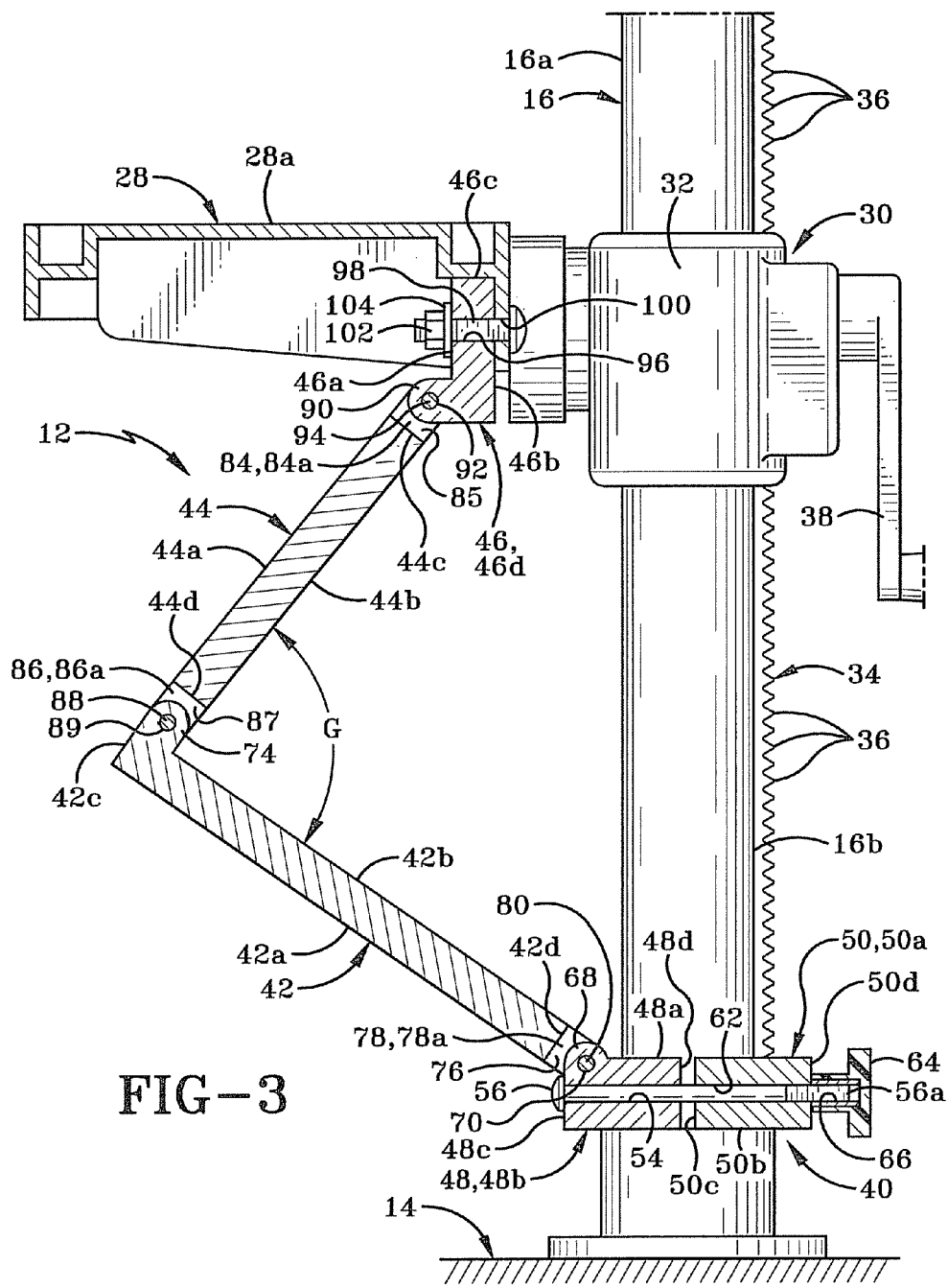
FIG. 3 is an enlarged side view of the inhibitor engaged with the column of the drill press table.

In accordance with a specific feature of the present invention, clamping assembly 40 comprises a first clamping member 48 and a second clamping member 50. First clamping member 48 is a generally rectangular block having a top surface 48a, a bottom surface 48b, a first end 48c, a second end 48d, a first side 48e and a second side 48f. Second end 48d defines a recess 52 therein that is complementary to a portion of the front surface 16a of column 16. In particular, since column 16 is circular in cross-sectional shape, recess 52 is semi-circular or C-shaped when viewed from above or below. This semi-circular shape enables that portion of second end 48d that defines recess 52 to abut the portion the front surface 16a of column 16. First clamping member 48 further defines a pair of spaced-apart through holes 54 (FIG. 3) that extend from first end 48c through to second end 48d and are situated on either side of recess 52. Only one hole 54 is shown in FIG. 3 but it will be understood that the second hole is parallel thereto. Hole 54 is positioned a short distance inwardly from one of first and second sides 48e, 48f and the second hole is positioned a short distance inwardly from the other of first and second sides 48e, 48f. Each hole 54 is configured to receive a first portion of a bolt 56 therethrough to secure first clamping member 48 to second clamping member 50, as will be hereinafter described.

In accordance with another specific feature of the present invention, first clamping member 48 further includes a flange 68 that projects upwardly from top surface 48a proximate first end 48c. Flange 68 has a first side that preferably is disposed adjacent first side 48e of first clamping member 48, and has a second side that preferably is disposed adjacent second side 48f of first clamping member 48. An aperture 70 is defined through flange 68 and extends from the first side of flange 68 to the second side thereof.

Second clamping member 50 is a generally rectangular block having a top surface 50a, a bottom surface 50b, a first end 50c, a second end 50d, a first side 50e and a second side 50f. First end 50c defines a recess 58 that is complementary to a portion of rear surface 16b of column 16. Since column 16 is circular in cross-sectional shape, recess 58 is generally semi-circular or C-shaped so that the portion of first end 50c that defines recess 58 will be in abutting contact with a portion of rear surface 16b of column 16. In accordance with another specific feature of the present invention, first end 50c further defines a generally U-shaped notch 60 that is centrally positioned along the length of recess 58 and extends for a distance toward second end 50d. Notch 60 extends between top and bottom surfaces 50a, 50b of second clamping member and is provided to receive a portion of track 34 and teeth 36 therein when second clamping member 50 engages rear surface 16b of column 16.

Second clamping member 50 further defines a pair of spaced-apart through holes 62 that extend between first end 50c and second end 50d and are situated on either side of recesses 58/60. Only one hole 62 is shown in FIG. 3 but it will be understood that the second of the pair of holes is substantially parallel to hole 62. One of the holes 62 is located a short distance inwardly from one of first and second sides 50e, 50f and the other of the holes is located a short distance inwardly from the other of first and second sides 50e, 50f. Each hole 62 is aligned with one of holes 54 in first clamping member 48 and is configured to receive a second portion of bolt 56 therethrough when first and second clamping members 48, 50 are engaged.

The end 56a of each bolt 56 is threaded and is configured to be locked in place in holes 54, 62 by a handle 64. Each handle 64 defines a threaded cavity 66 therein that threadably engages end 56a of one of bolts 56. Handle 64 is removed from bolt 56 when it is desired to position inhibitor assembly 12 on drill press 10. Bolts 56 are withdrawn from second clamping member 50 thus breaking the engagement between first and second clamping members 48, 50. First clamping member 48 is placed in abutting contact with front surface 16a of column 16. Second clamping member 50 is placed in abutting contact with rear surface 16b of column 16 and bolts 56 are inserted through aligned holes 54, 62. Handles 64 are re-engaged with ends 56a and are rotated until column 16 is tightly clamped between first and second clamping members 48, 50. It should be noted that when second clamping member 50 is engaged with back surface 16b, a portion of track 34 with its backwardly projecting teeth 36 is received in notch 60 of second clamping member 50. If notch 60 was not provided, first end 50c defining recess 58 could potentially damage teeth 36 and track 34. It should further be noted that clamping member 40 is sufficiently clamped to column 16 that substantially all tendency of clamping member 40 to rotate around column 16 is prevented. Thus, the clamping member end of inhibitor assembly 12 is essentially fixedly retained on column 16.

As indicated previously and in accordance with yet another feature of the present invention, inhibitor assembly 12 further includes a plate assembly 42/44. Plate assembly 42/44 comprises a first plate 42 that is engaged with first clamping member 48 and a second plate 44 that is engaged with connector assembly 46. First and second plates 42, 44 are engaged with each other.

Figure 4:
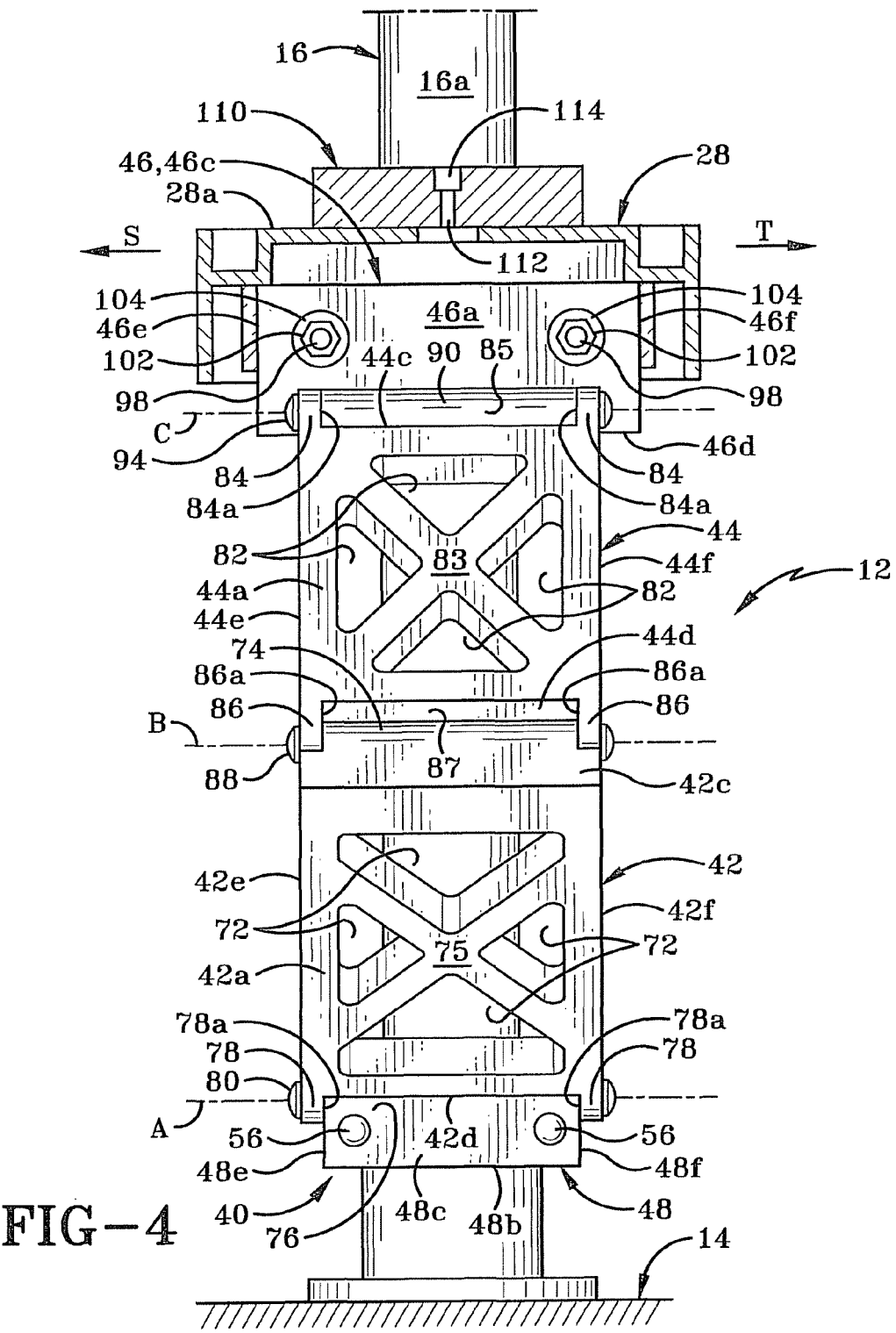
FIG. 4 is a front view of the inhibitor engaged with the column of the drill press table as shown in FIG. 3.

First plate 42 has a front face 42a, a back face 42b, a first end 42c, a second end 42d, a first side 42e and a second side 42f. Preferably, first plate 42 is generally square in shape although other shapes, such as a rectangle, may also be utilized without departing from the scope of the present invention. As is shown in FIG. 4, first plate 42 preferably defines one or more apertures 72 that extend between front and back faces 42a, 42b. Apertures 72 reduce the overall weight of first plate 42 and preferably are formed in a pattern that leaves a generally cruciform region 75 of plate material behind. The shape of region 75 is advantageous in that it aids in providing sufficient strength and rigidity to first plate 42 to withstand the lateral torque to which it is subjected.

A first flange 74 is provided on first plate 42 extending outwardly from first end 42c thereof and generally at right angles to back face 42b. First flange 74 has a first side that is disposed a distance inwardly from first side 42e of first plate 42 and a second side that is disposed a distance inwardly from second side 42f of first plate 42. First flange 74 defines an aperture 89 that extends from the first side of first flange 74 to the second side thereof.

A pair of second flanges 78 extends outwardly from second end 42d of first plate 42. Each second flange 78 has a first face that is substantially aligned with one of the first and second sides 42e, 42f of first plate 42. Each second flange further includes a second face 78a that is disposed a short distance from the one of the first and second sides 42e, 42f such that a gap 76 is defined between the two second faces 78a. Gap 76 is complementary in shape and size to flange 68 on first clamping member 48. A front face of second flange 78 is generally aligned with front face 42a of first plate 42 and a back face of second flange 78 is generally aligned with back face 42b of first plate 42. Although not shown herein, it will be understood that each second flange 78 defines an aperture therein that extends between the first and second faces thereof. These apertures are configured to align with aperture 70 in flange 68 of first clamping member 48 and a pivot pin 80 is inserted through these aligned apertures to secure first plate 42 to first clamping member 48. Pivot pin enables first plate 42 to rotate or pivot relative to first clamping member 48. First plate 42 is therefore able to pivot about an axis "A" (FIG. 2) that extends through pivot pin 80. Because of the orientations of the various components in drill press 10, axis "A" is disposed substantially at right angles to the longitudinal vertical axis of column 16.

As indicated previously and in accordance with yet another feature of the present invention, plate assembly 42/44 further includes a second plate 44 that is rotatably engaged with first plate 42 and with connector assembly 46. Second plate 44 has a front face 44a, a back face 44b, a first end 44c, a second end 44d, a first side 44e and a second side 44f. Preferably, second plate 44 is generally square in shape although other shapes, such as a rectangle, may also be utilized without departing from the scope of the present invention. As is shown in FIG. 4, second plate 44 preferably defines one or more apertures 82 that extend between front and back faces 44a, 44b. Apertures 82 reduce the overall weight of second plate 44 and preferably are formed in a pattern that leaves a generally cruciform region 83 of plate material behind. The shape of region 83 is advantageous in that it aids in providing sufficient strength and rigidity to second plate 44 to withstand the lateral torque to which it is subjected.

A pair of spaced-apart first flanges 84 is provided on second plate 44 extending outwardly from first end 44c thereof. The front and back surfaces of first flanges 84 are generally aligned with front and back faces 44a, 44b of second plate 44. Each first flange 84 has a first side that is generally aligned with one of the first and second sides 44e, 44f of second plate 44. Each first flange 84 further has a second side 84a that is disposed a distance inwardly from the one of the first and second sides 44e, 44f of second plate 44 such that a gap 85 (FIG. 4) is defined therebetween. Although they are not shown in the attached figures, it will be understood that each of the first flanges 84 defines an aperture therein that extends from the first side of first flange 84 to the second side 84a thereof. The apertures in the pair of first flanges 84 are aligned with each other and are generally parallel to first end 44c.

Similarly, a pair of spaced-apart second flanges 86 is provided on second plate 44 extending outwardly from second end 44d thereof. Front and back surfaces of second flanges 86 are generally aligned with front and back faces 44a, 44b of second plate 44. Each second flange 86 has a first side that is generally aligned with one of the first and second sides 44e, 44f of second plate. Each second flange 86 further has a second side 86a that is disposed a distance inwardly from that one of the first and second sides 44e, 44f of second plate 44. A gap 87 (FIG. 2) is defined between second sides 86a that is complementary to the size of first flange 74 of first plate 42. Although they are not shown in the attached figures, it will be understood that each of the second flanges 86 defines an aperture therein that extends between first side of second flange 86 to the second side 86a thereof.

Second flanges 86 are disposed on either side of first flange 74 on first plate 42 and the apertures in second flanges and first flange are aligned with each other and a pivot pin 88 is inserted through these aligned apertures. Pivot pin 88 enables first and second plates 42, 44 to rotate about an axis "B" (FIG. 2) that extends through pivot pin 88. As is evident from FIG. 4. axes "A" and "B" are substantially parallel to each other and are horizontally oriented, both being disposed generally at right angles to the column 16.

Although not shown herein, it will be understood that plate assembly 42/44 may include an additional plate that is connected to one of first and second plates 42, 44 by a pivot pin, or may include a number of additional plates that are rotatably connected in end-to-end relationship with the plates of plate assembly 42/44. These additional plates could be included in plate assembly 42/44 to increase the length "H1" between first and second ends 43a, 43b to enable the device to be connected to different sizes or makes of drill press.

Connector assembly 46 includes a generally rectangular connector plate that has a front face 46a, a back face 46b, a first end 46c, a second end 46d, a first side 46e, and a second side 46f. A flange 90 extends outwardly from front face 46a thereof proximate second end 46d and generally at right angles to front face 46a. Flange 90 has a first side that is spaced a distance inwardly from first side 46e and has a second side that is spaced a distance inwardly from second side 46f. Flange 90 defines an aperture 92 (FIG. 3) therein that extends from the first side of flange 90 to the second side thereof. When second plate 44 is engaged with connector assembly 46, flange 90 fits into gap 85 between first flanges 84 of second plate 44, so that first flanges 84 are positioned on each end of flange 90. The apertures in first flanges 84 and flange 90 are aligned with each other and a pivot pin 94 is inserted therethrough. Pivot pin 94 enables second plate 44 to pivot relative to connector assembly 46 about an axis "C" that extends through pivot pin 94. Again, axis "C" is substantially parallel to both of axes "A" and "B" and is disposed horizontally and generally at right angles to column 16.

Figure 2:
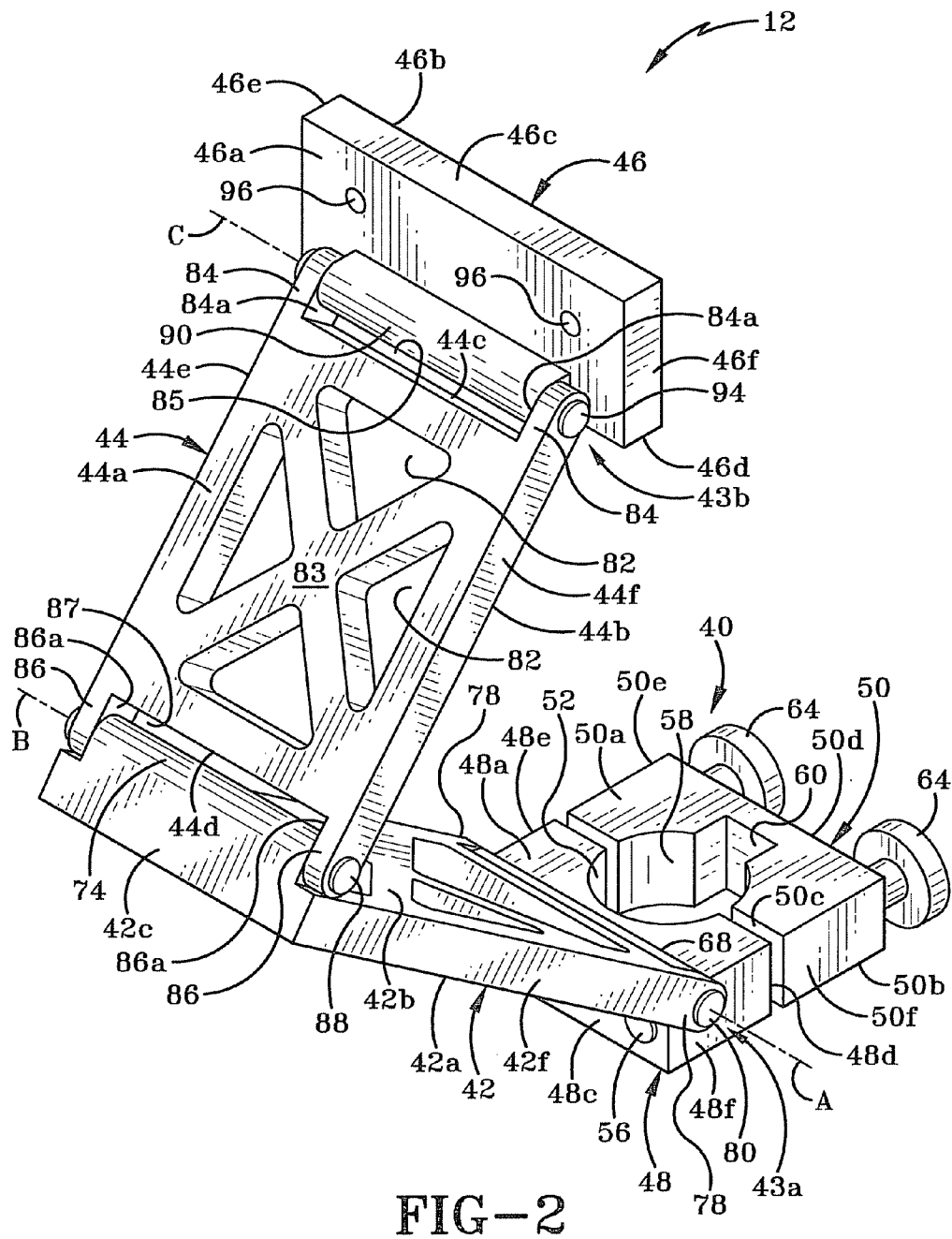
FIG. 2 is a perspective view of the lateral motion inhibitor.

As best seen in FIG. 2, a pair of spaced-apart holes 96 is defined in connector assembly 46. Each hole 96 extends from front face 46a to back face 46b of connector assembly 46 and is configured to receive a bolt 98 (FIG. 3) therethrough. Each bolt 98 is inserted through an aperture 100 in a lower region of table 28 and nuts 102 and washers 104 are used to secure bolts 98 in place as is illustrated in FIG. 4. Thus, connector assembly 46 is fixedly secured to table 28 and moves therewith as table 28 is raised or lowered by adjustment assembly 30. However, because of the nature of the connection between connector assembly 46 and table 28, connector assembly 46 maintains the lateral positioning of table 28 as the table is raised and lowered.

Figure 5:
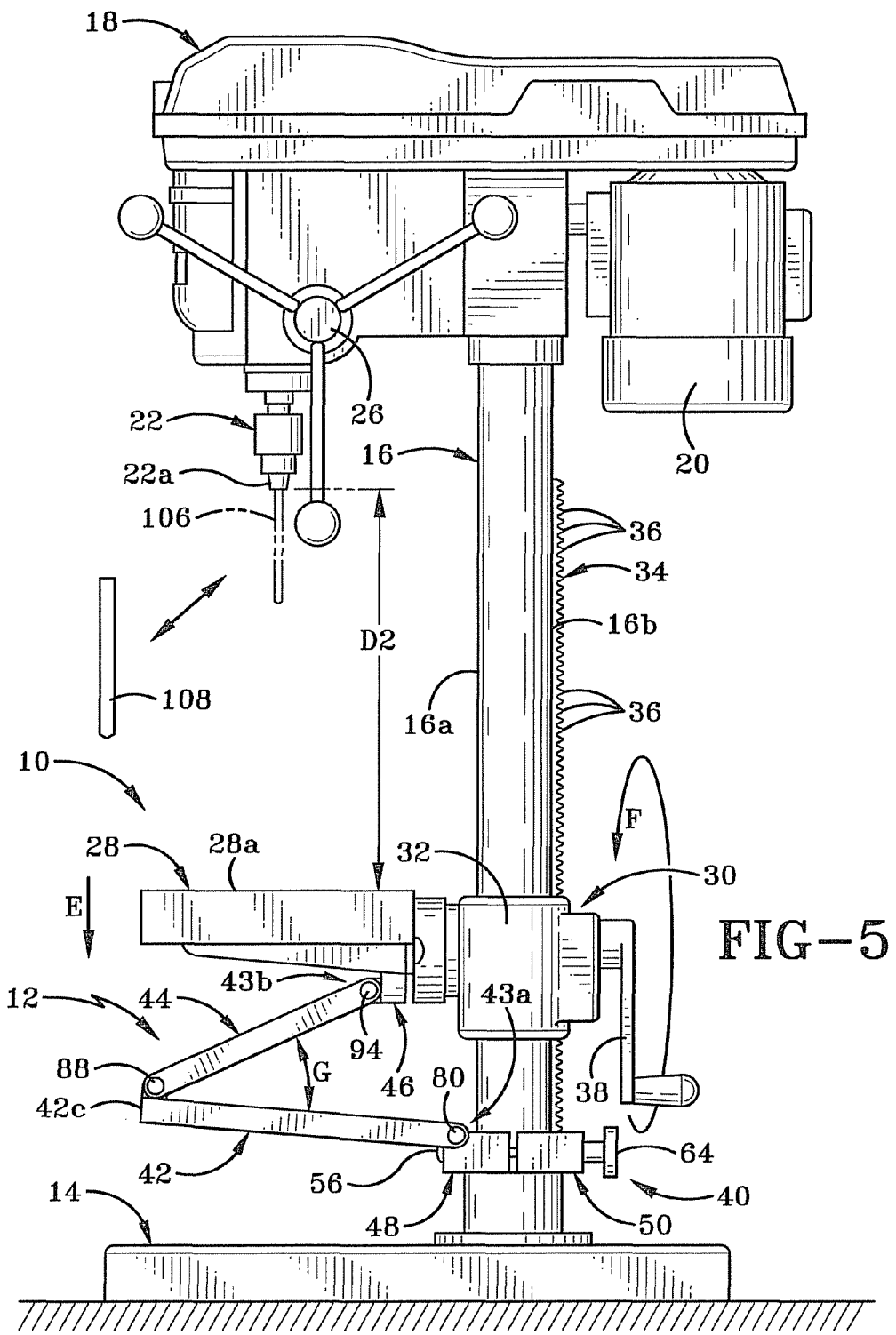
FIG. 5 is a side view of the drill press table shown in an adjusted position where the drill press table is spaced a greater distance from the drill bit than in FIG. 1.

Inhibitor assembly 12 is used in the following manner after being engaged with the column 16 and table 28 of drill press 10 as described above. FIG. 1 shows table 28 positioned a first distance "D1" from a bottom end 22a of chuck 22. A drill bit 106 is engaged in chuck 22 and drill press 10 may then be used to drill an initial hole 112 (FIG. 4) into a workpiece 110 that is positioned on upper surface 28a of table 28. FIG. 5 illustrates a situation where a different drill bit 108 is to be used instead of drill bit 106. In this particular instance, drill bit 108 has a greater diameter in drill bit 106 and is used to drill a counter bore. In order to exchange drill bit 106 for drill bit 108, it is necessary to vertically lower table 28 to a distance "D2" from bottom end 22a of chuck 22. In order to lower table 28 in the direction indicated by arrow "E" (FIG. 5), crank 38 is rotated in the direction indicated by arrow "F". The downward motion of table 28 causes second plate 44 of inhibitor assembly 12 to pivot in a first direction relative to connector assembly 46 and about axis "C". The rotation of second plate 44 also causes first plate 42 to pivot about axes "B" and "A" relative to second plate 44 and first clamping member 48, respectively so that the angle "G" between first and second plates 42, 44 decreases in size.

Because of the size of first and second plates 42, 44 and their strength and rigidity, lateral motion, i.e., motion in the directions "S" and "T" in FIG. 4, is substantially prevented. Consequently, when drill bit 108 is engaged in chuck 22 and crank 38 is rotated in the opposite direction to arrow "F" to return table 28 to its original height relative to bottom end 22a of chuck 22 (i.e., a distance "D1" away from bottom end 22a), the initial hole 112 (FIG. 4) that has been previously drilled in the workpiece 110 with drill bit 106 will be substantially exactly aligned with drill bit 108 and the tip of drill bit 108 is inserted into initial hole 112. Drill press 10 is then activated to rotate drill bit 108 to drill a second hole 114 as a counter bore hole. Initial and second holes 112, 114 together form a "combination hole" which is drilled in workpiece 110. As is evident from the attached figures, holes 112, 114 have a common center line.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A lateral motion inhibitor assembly for a table in a drill press, where the drill press includes a vertically oriented column supporting a housing that has a drill chuck extending therefrom, and an adjustment assembly engaging the table to the column, said inhibitor assembly comprising:
   a clamping assembly which is adapted to fixedly engage the column;
   a connector assembly which is adapted to fixedly engage the table; and a plate assembly which movably extends between the clamping assembly and the connector assembly; and wherein the inhibitor assembly is adapted to restrain the table against lateral movement when the table's vertical position relative to a drill chuck is changed by the adjustment assembly.

2. The inhibitor assembly as defined in claim 1, wherein the plate assembly has a first end secured to the clamping assembly and a second end secured to the connector assembly, and wherein the plate assembly has a length measured vertically between the first and second ends thereof, and wherein the length is adapted to change as the table is vertically raised or lowered relative to the drill chuck by the adjustment assembly.

3. The inhibitor assembly as defined in claim 2, wherein the length of the plate assembly is adapted to increase when the table is raised vertically by the adjustment assembly; and the length of the plate assembly is adapted to decrease when the table is lowered vertically by the adjustment assembly.

4. The inhibitor assembly as defined in claim 3, wherein the plate assembly comprises:
   a first plate;
   a first pivot pin engaging the first plate to the clamping assembly; said first pivot pin permitting rotation of the first plate relative to the clamping assembly and about an axis that extends through the first pivot pin;
   a second plate;
   a second pivot pin engaging the second plate to the first plate; said second pivot pin permitting rotation of the second plate relative to the first plate and about an axis that extends through the second pivot pin; and wherein the first and second pivot pins are adapted to be disposed substantially at right angles to the vertical column.

5. The inhibitor assembly as defined in claim 4, wherein the connector assembly includes:
   a connector plate adapted to be engaged to the drill press table;
   a third pivot pin engaging the connector plate to the second plate; said third pivot pin permitting rotation of the second plate relative to the connector plate and about an axis that extends through the third pivot pin; and wherein the third pivot pin is adapted to be disposed substantially at right angles to the vertical column.

6. The inhibitor assembly as defined in claim 5, wherein the clamping assembly comprises:
   a first clamping member adapted to engage a front surface of the vertical column;
   a second clamping member adapted to engage a rear surface of the vertical column; and
   one or more securement members for detachably securing the first clamping member to the second clamping member.

7. The inhibitor assembly as defined in claim 4, wherein the first plate has a front surface, a back surface, a first end, a second end, a first side, a second side, and a longitudinal axis extending between the first and second ends;
   the second plate has a front surface, a back surface, a first end, a second end, a first side, a second side, and a longitudinal axis extending between the first and second ends; and
   the second pivot pin secures the first end of the first plate to the second end of the second plate; and wherein the first and second plates rotate about the second pivot pin relative to each other.

8. The inhibitor assembly as defined in claim 7, wherein the first plate further includes:
   a first flange extending longitudinally outwardly from the first end of the first plate; said first flange having a first side and a second side, where the first side of the first flange is disposed a distance inwardly from the first side of the first plate, and the second side of the first flange is disposed a distance inwardly from the second side of the first plate; and
   a first aperture is defined in the first flange and extends from the first side of the first flange to the second side thereof; and a first portion of the second pivot pin extends through the first aperture.

9. The inhibitor assembly as defined in claim 8, wherein the first flange is disposed generally at right angles to the back surface of the first plate.

10. The inhibitor assembly as defined in claim 8, wherein the first plate further includes:
    a pair of second flanges extending outwardly from the second end of the first plate, wherein each second flange has a first side and a second side; wherein the first side of each second flange is generally aligned with one of the first and second sides of the first plate, and a second side that is disposed a spaced distance inwardly from the one of the first and second sides;
    a gap is defined between the second sides of the second flanges; and
    a second aperture is defined in each second flange, each of said second apertures extending from the first side of the second flange to the second side thereof; and said second apertures are aligned with each other; and wherein a portion of the first pivot pin is received through each of the second apertures.

11. The inhibitor assembly as defined in claim 10, wherein the second plate further includes:
    a pair of third flanges extending longitudinally outwardly from the second end of the second plate; and wherein each of said third flanges has a first side and a second side; and the first side of each third flange is substantially aligned with the one of the first and second sides of the second plate, and the second side of each third flange is spaced a distance inwardly away from the one of the first and second sides of the second plate; and
    a gap is defined between the second sides of the two third flanges; and wherein each third flange further includes:
    a third aperture defined in each third flange and extending between the first and second sides thereof; and wherein the third apertures in the third flanges are aligned with each other.

12. The inhibitor assembly as defined in claim 11, wherein the first flange of the first plate is received within the gap between the third flanges of the second plate and between the second sides of the two third flanges, and when the second flange is so received, the second aperture in the second flange aligns with the third apertures in the third flanges and the second pivot pin is received therethrough.

13. The inhibitor assembly as defined in claim 12, wherein the second plate further includes:
    a pair of fourth flanges extending longitudinally outwardly from the first end of the second plate; and wherein each of said fourth flanges has a first side and a second side; and the first side of each fourth flange is substantially aligned with the one of the first and second sides of the second plate, and the second side of each fourth flange is spaced a distance inwardly away from the one of the first and second sides of the second plate; and
    a gap is defined between the second sides of the pair of fourth flanges; and wherein each fourth flange further includes:
    a fourth aperture defined in each fourth flange and extending between the first and second sides thereof; and wherein the fourth apertures in the fourth flanges are aligned with each other.

14. The inhibitor assembly as defined in claim 13, wherein the connector assembly includes:
    a connector plate having a front surface, a back surface, a first end, a second end, a first side, and a second side;
    a flange extending outwardly from the front surface proximate the second side, and wherein the flange has a first side disposed a distance inwardly from the first side of the connector plate, and a second side disposed a distance inwardly from the second side of the connector plate;
    an aperture defined in the connector assembly flange and extending between the first and second sides thereof; and wherein the connector assembly flange is received in the gap between the second sides of the two fourth flanges on the second plate, and wherein the aperture in the connector assembly flange is alignable with the fourth apertures in the fourth flanges; and wherein the third pivot pin is receivable therethrough.

15. The inhibitor assembly as defined in claim 2, wherein the clamping assembly comprises:
    a first clamping member having a top surface, a bottom surface, a first end, a second end, a first side and a second side; and wherein the second end of the first clamping member is disposed in abutting contact with a front surface of the column;
    a second clamping member having a top surface a bottom surface, a first end, a second end, a first side and a second side; and wherein the first end of the second clamping member is disposed in abutting contact with a rear surface of the column;
    a securement assembly engaging the first and second clamping members together such that a portion of the column is clamped therebetween.

16. The inhibitor assembly as defined in claim 15, wherein the first clamping member further comprises:
    a fifth flange disposed proximate the first end of the first clamping member and extending outwardly from the top surface thereof; said fifth flange being received in the gap between the second flanges on the first plate; and wherein said fifth flange has a first end and a second end and a fifth aperture is defined between the first and second ends of the fifth flange and said fifth aperture is alignable with the second apertures in the second flanges, and said first pivot pin is received through said aligned fifth and second apertures.

17. The inhibitor assembly as defined in claim 15, wherein the clamping assembly further comprises:
   a first recess defined in the second end of the first clamping member, said first recess being complementary in shape to a portion of the front surface of the column; and
   a second recess defined in the first end of the second clamping member, said second recess being complementary in shape to a portion of the rear surface of the column.

18. The inhibitor assembly as defined in claim 17, wherein the first recess is substantially semi-circular when viewed from above, and the second recess includes:
   a first region that is substantially semi-circular when viewed from above; and
   a second region that is substantially U-shaped when viewed from above, and wherein the U-shaped second region is disposed generally centrally on the semi-circular first region and extends for a distance away from the first region and toward the second end of the second clamping member.

19. In combination:
   a drill press including:
   a base;
   a support column extending vertically upwardly from the base;
   a housing supported by the column and spaced a distance above the base;
   a chuck extending outwardly from the housing and adapted to receive a drill bit therein;
   a table extending horizontally outwardly from the column in a position intermediate the base and the housing; said table being adapted to support a workpiece to be drilled thereon;
   an adjustment assembly securing the table to the column, said adjustment assembly being activatable to vertically raise or lower the table relative to the chuck; and
   an inhibitor assembly engaged with the column and the table of the drill press, said inhibitor assembly substantially preventing the table from moving laterally as it is vertically raised and lowered by the adjustment assembly.

20. The combination as defined in claim 19, wherein the inhibitor assembly comprises:
   a clamping assembly which engages the column;
   a connector assembly which engages the table; and
   a plate assembly which extends between the clamping assembly and the connector assembly.

21. The combination as defined in claim 20, wherein the clamping assembly is fixedly engaged with the column and the connector assembly is fixedly engaged with the table; and wherein the plate assembly is movably engaged with each of the clamping assembly and the connector assembly.

22. The combination as defined in claim 21, wherein the plate assembly has a first end secured to the clamping assembly and a second end secured to the connector assembly, and wherein the plate assembly has a length measured vertically between the first and second ends thereof, and the length changes as the table is vertically raised or lowered by the adjustment assembly.

23. The combination as defined in claim 22, wherein the length of the plate assembly increases when the table is raised vertically by the adjustment assembly; and the length of the plate assembly decreases when the table is lowered vertically by the adjustment assembly.

24. The combination as defined in claim 20, wherein the inhibitor assembly further comprises:
   a first pivot pin securing the first end of the plate assembly to the clamping assembly; and
   a second pivot pin securing the second end of the plate assembly to the connector assembly.

25. A method of drilling a combination hole in a workpiece using a first drill bit and a second drill bit; said method comprising the steps of:
   connecting a lateral motion inhibitor to a table and a vertical column of a drill press;
   engaging the first drill bit in a chuck on the drill press such that the first drill bit extends downwardly toward the table;
   positioning the workpiece to be drilled on the table;
   drilling an initial hole of the of the combination hole in a first location on the workpiece using the first drill bit;
   increasing the vertical distance between the table and the chuck;
   removing the first drill bit from the chuck;
   installing the second drill bit into the chuck;
   decreasing the vertical distance between the table and the chuck; and
   positioning a tip of the second drill bit into the initial hole in the workpiece; and
   drilling a second hole of the combination hole in the workpiece in the first location using the second drill bit.

26. The method as defined in claim 25, wherein the step of engaging the lateral motion inhibitor with the drill press table includes the steps of:
   engaging a clamping assembly of the inhibitor assembly onto the vertical column of the drill press; and
   securing a connector assembly of the inhibitor assembly onto the table of the drill press.

27. The method as defined in claim 26, wherein the step of engaging the clamping assembly onto the column comprises the steps of:
   positioning a second end of a first clamping member of the clamping assembly into abutting contact with a front surface of the column;
   positioning a first end of a second clamping member of the clamping assembly in abutting contact with a rear surface of the column; and
   securing the first and second clamping assemblies together.

28. The method as defined in claim 27, wherein the step of securing the first and second clamping assemblies together includes the steps of:
   inserting a first fastener through a first aperture in the first clamping member and through an aligned first aperture in the second clamping member;
   inserting a second fastener through a second aperture in the first clamping member and through an aligned second aperture in the second clamping assembly; and
   engaging a handle with free ends of the first and second fasteners that extend outwardly from a second end of the second clamping member.

\* \* \* \* \*